United States Patent [19]

Sakata et al.

[11] Patent Number: 5,023,730
[45] Date of Patent: Jun. 11, 1991

[54] INFORMATION RECORDING SYSTEM AND APPARATUS

[75] Inventors: Tsuguhide Sakata, Machida; Norio Kimura, Tokyo; Masahiro Takei, Yokohama, all of Japan

[73] Assignee: Canon Kabushiki Kaisha, Tokyo, Japan

[21] Appl. No.: 539,306

[22] Filed: Jun. 18, 1990

Related U.S. Application Data

[60] Continuation of Ser. No. 369,931, Jun. 22, 1989, abandoned, which is a division of Ser. No. 289,455, Dec. 22, 1988, Pat. No. 4,914,526, which is a continuation of Ser. No. 864,149, May 16, 1986, abandoned.

[30] Foreign Application Priority Data

May 22, 1985 [JP] Japan .................................. 60-109640
May 24, 1985 [JP] Japan .................................. 60-111467

[51] Int. Cl.⁵ ............................................... G11B 5/09
[52] U.S. Cl. ............................................. 360/48; 360/8
[58] Field of Search .......................................... 360/48

[56] References Cited

U.S. PATENT DOCUMENTS

4,672,471  6/1987  Gouda .................................. 357/49

Primary Examiner—Vincent P. Canney
Attorney, Agent, or Firm—Fitzpatrick, Cella, Harper & Scinto

[57] ABSTRACT

An information recording system and apparatus records on a recording medium an audio signal, which is timebase compressed at a predetermined compression ratio, together with a data signal indicative of the compression ratio. A start signal indicative of the start of the audio signal, the data signal, the audio signal and the end signal indicative of the end of an audio signal are recorded in this order. A recording medium recorded by such system and apparatus is disclosed. A reproduction apparatus is also disclosed which reproduces the information out of such recording medium.

12 Claims, 8 Drawing Sheets

INFORMATION RECORDING SYSTEM AND APPARATUS

This application is a continuation application Ser. No. 07/369,931 filed June 22, 1989, now abandoned; which is a divisional of pending prior application Ser. No. 07/289,455 filed Dec. 22, 1988 now U.S. Pat. No. 4,914,526, which is a continuation of application Ser. No. 06/864,149 filed May 16, 1986, now abandoned.

BACKGROUND OF THE INVENTION

1. Field of the Invention

The present invention relates to information recording systems and apparatus, and more particularly to a recording system and apparatus which records an information signal, a start and an end signal representative of the start and end of the information signal, respectively, and a data signal related to the information signal on a recording medium.

2. Related Background Art

In recently proposed video floppy systems it is proposed to record a video signal as well as an audio signal on a magnetic sheet provided as a recording medium.

Figure 1:
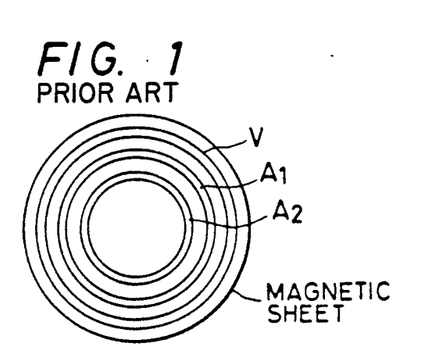
FIG. 1 shows recording tracks on a magnetic sheet.

FIG. 1 diagramatically shows both the video and audio signals present together on a magnetic sheet. For example, according to the standards on video floppies, field video signals (V) and audio signals (A1, A2) for up to 50 tracks in all can be recorded on a magnetic sheet. The audio signal is converted by time base compression into the video band and recorded in FM modulated form. The recording time per track is approximately 10 seconds, assuming that the audio band is 5 KHz and the time base compression ratio is 640. Also, assuming that the audio band is 2.5 KHz and the time base compression ratio is 1,280, recording for approximately 10 seconds is possible. In this case, the audio signal may be completed in a single track or extended into the next track.

Figure 2:
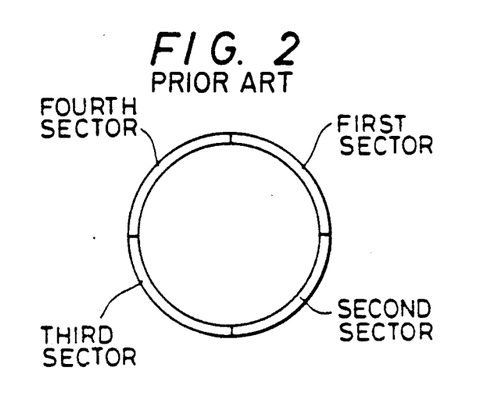
FIG. 2 shows an audio track consisting of sectors.

The ring-like audio track is divided into four sectors, as shown in FIG. 2. For example, in the case where recording for 10 seconds is possible, an amount of information for 2.5 seconds is alloted to a single sector.

Figure 3:
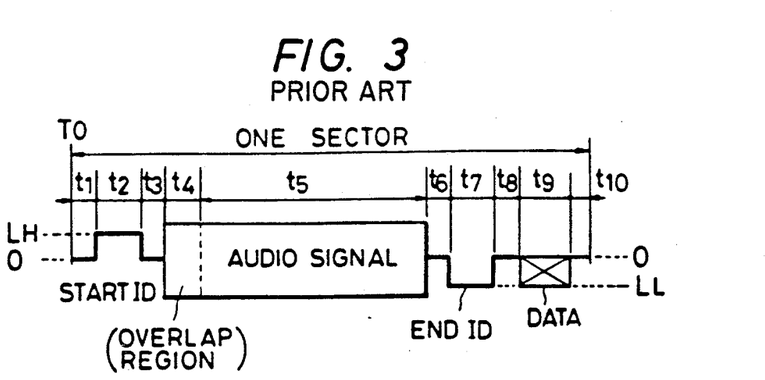
FIG. 3 shows a conventionally proposed arrangement of an audio signal, an ID signal and a data signal.

FIG. 3 illustrates the form of an audio signal and an additional signal to be recorded on a single sector.

In FIG. 3, after an elapse of $t_1$ from time $T_0$, a start ID signal having a level $L_H$ continues for time $t_2$ for obtaining the timing to read audio signal information. After a blank of $t_3$, the audio signal starts. During the preceding interval of time $t_4$, the signal on a sector overlaps with that on the immediately preceding sector. This does not occur in the first sector corresponding to the leading portion of the audio signal. A new audio signal is in the remaining time $t_5$, the length of which is variable; 2.5 seconds at a maximum in the mode of 10 seconds per track. After a subsequent blank of $t_6$, an end ID signal having a level of $L_2$ continues for $t_7$ in order to detect the end of the audio signal and to obtain the timing of reading data signal related to the subsequent audio signal. After a blank of $t_8$, the data interval continues for $t_9$. Then a blanking interval of time $t_{10}$ appears, the length of which is varied according to the interval $t_5$ of the preceding audio signal, and thus one sector cycle ends. This form is basically the same in any of the sectors where the audio signal is present. The interval of the audio signal shown by $t_5$ is variable and selected so that the interval $t_5 + t_{10}$ is constant at all times. Thus, the length of the audio signal determines the position of the end ID and data signals.

The data signal includes, in the form of digital data, the number indicative of the position, on the magnetic sheet, of a track on which the audio signal is recorded, the number of the leading and subsequent tracks through which audio signals are recorded continuously, the number of the tracks through which the video signal corresponding to the audio signal are recorded, the compression ratio of the audio signal, etc.

Figure 4:
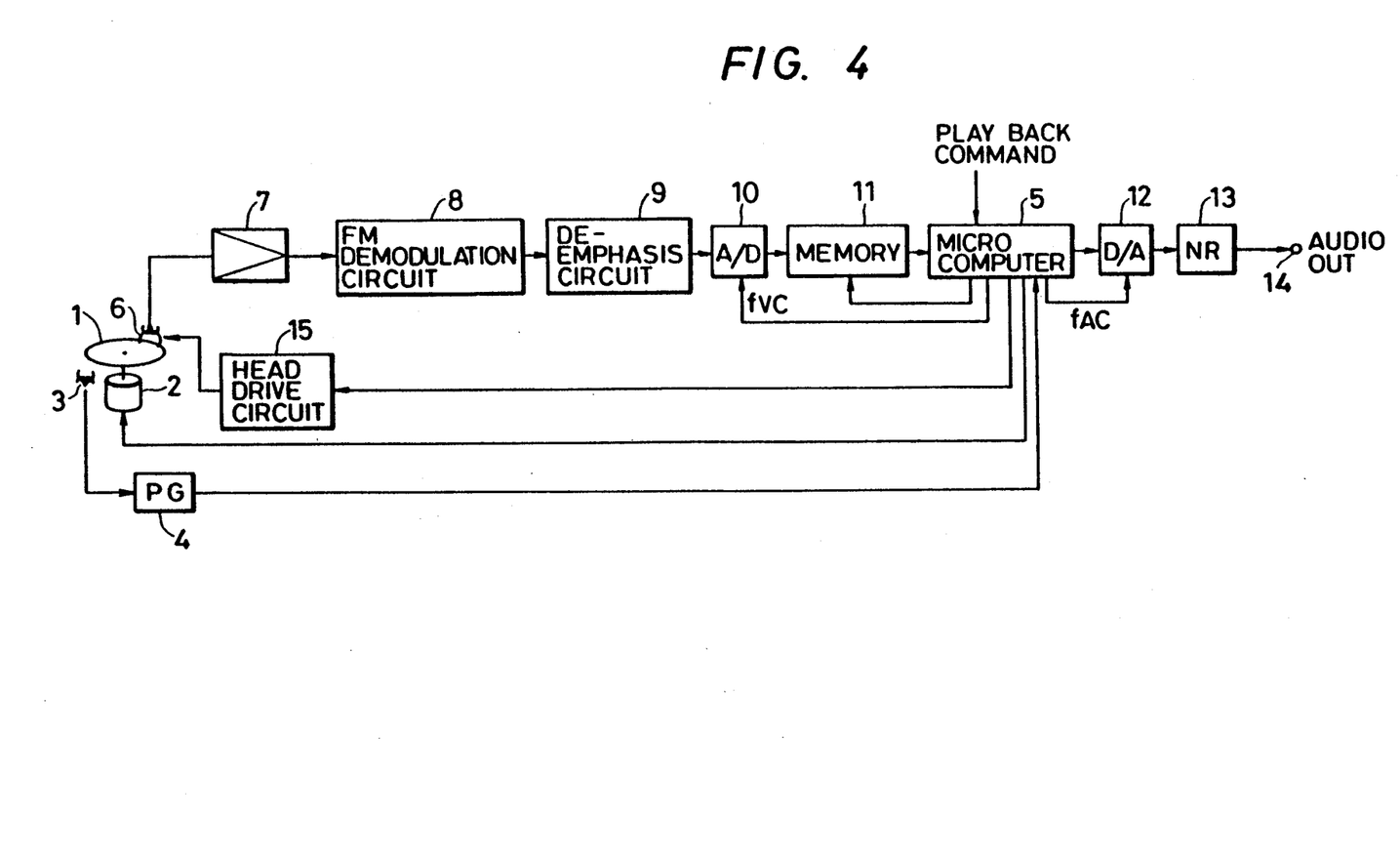
FIG. 4 is a block diagram of one example of a reproduction apparatus which is capable of reproducing the signals of FIG. 3.

FIG. 4 shows an example of a device to reproduce an audio signal recorded in the form of a signal such as is mentioned above.

Reference numeral 1 denotes a magnetic sheet on which an audio signal, additional signals (ID and data signals) and a video signal such as are mentioned above are recorded. The magnetic sheet 1 is rotated at a constant speed by a motor 2 under control of a control circuit including a microcomputers, etc., (hereinafter referred to as the "MICOM"). In this case, the rotation speed is 3,600 rpm according to NTSC system on the assumption that one complete rotation of sheet 1 causes a one-field video signal to be recorded.

A PG head 3 detects a PG mark (not shown) provided on sheet 1. A PG detection circuit 4 outputs a PG signal of one pulse per unit rotation of sheet 1 on the basis of the output of head 3. The output of the PG detection circuit 4 is applied to MICOM 5.

A magnetic reproduction head 6 picks up audio and additional signals and delivers them through an reproduction amplifier 7 to an FM demodulator 8 by which is produced a demodulated signal which is then deemphasized by a deemphasis circuit 9 and supplied to an A/D converter 10.

When MICOM 5 is given a reproduction command, it causes A/D converter 10 to perform sampling at a predetermined frequency $f_{VC}$ and A/D conversion in accordance with the PG signal from PG detection circuit 4 and stores the output of the converter 10 in a memory 11.

As will be described later, the start point of the first sector of FIG. 2 is controlled at the time of recording so that it always has a constant phase relationship to the PG mark on sheet 1. Thus, the sampling and A/D conversion by A/D converter 10 and storage to memory 11 are performed according to the PG signal from the start point of the first sector.

In this way, when signals for one track are stored in memory 11, MICOM 5 starts to reproduce the audio signal while controlling an expansion ratio for audio reproduction, reproduction sequence, etc., on the basis of the data signal. That is, MICOM 5 reads the audio signals in memory 11 in address units and provides them to a D/A converter 12 at a frequency $f_{AC}$ corresponding to the expansion ratio. The output of D/A converter is produced as audible audio signals through a noise reduction circuit 13 from an output 14.

At this time, the position of head 6 on sheet 1 is controlled by a head drive circuit 15 under control of MICOM 5.

Figure 5A:
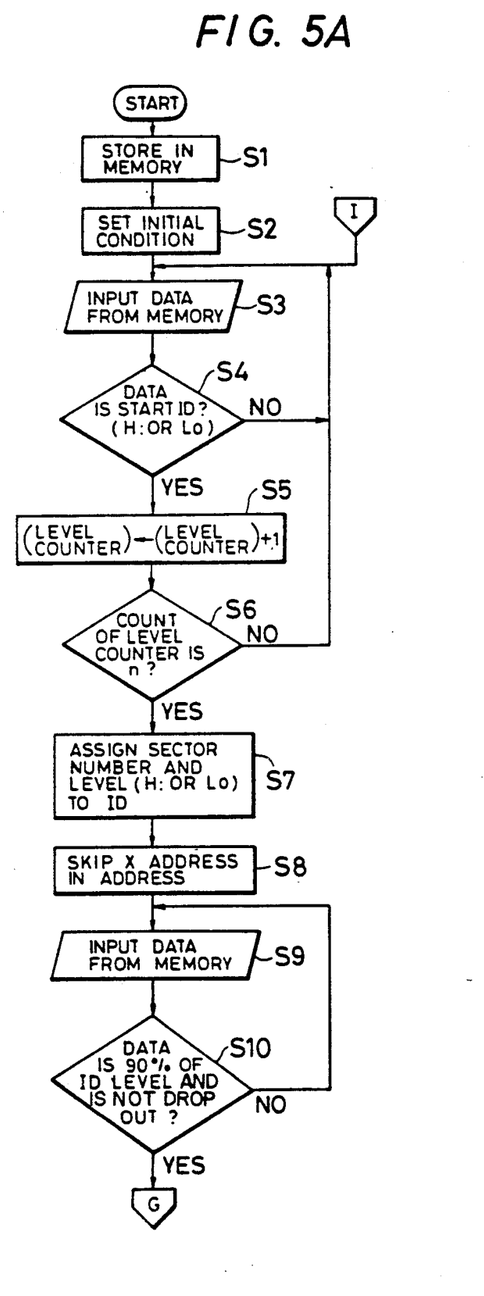
FIGS. 5A, 5B and 5C are a flowchart showing a portion of the operation flow for MICOM of FIG. 4 when the signals in the arrangement of FIG. 3 are reproduced.
Figure 5B:
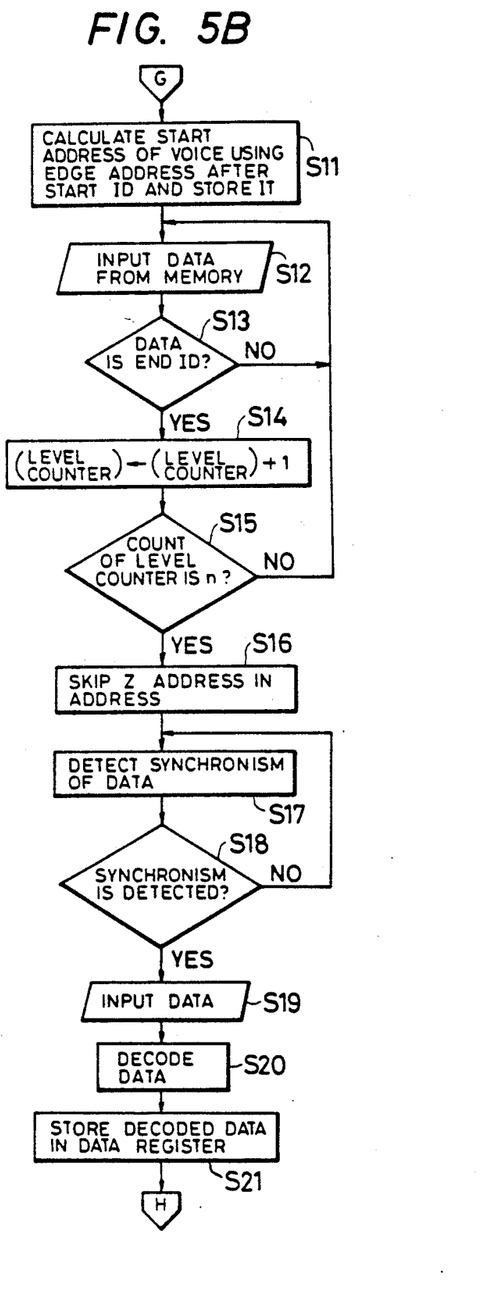
Figure 5C:
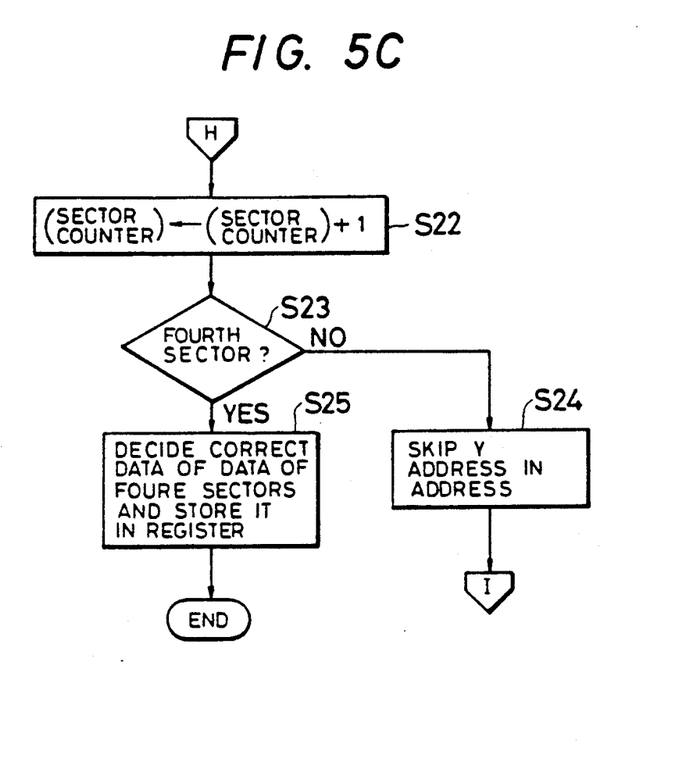

FIG. 5 is a flowchart for causing MICOM 5 to detect the start address for the audio signal in order to detect the data signal subsequent to the end ID signal, decode the contents of the data thereby to remove the additional signals, and extract the audio signal only.

The additional and audio signals reproduced by head 6 are stored in memory 11 (step 1). Initial conditions are set in counters, etc., required for detection of the additional and audio signals (step 2). The signals stored in memory 11 are read (step 3). It is determined whether the read signal is the start ID signal represented by high (or low) level (step 4). If the read signal is not the start ID, control returns to step 3 and the next stored signal is read, which will be repeated until the start ID signal is detected. When the start ID signal is detected, a level counter in another area of memory 11 counts a high (or low) level of the ID signal (step 5). It is determined whether or not high (or low) level has been counted n times successively (step 6). The steps 3–6 are repeated until such state has been reached. This eliminates noise and ensures that the start ID signal will be detected. After the start ID signal has been detected, the level of the start ID signal is assigned to the bits in memory 11 corresponding to the number of the sector to which the start ID is applied (step 7).

X addresses are skipped in the addresses of memory 11 within the level of the start ID signal to the address of a point before the trailing edge of the start ID signal (step 8). Then, the trailing edge of the ID signal is detected, that is, the stored signals are again sequentially read out of memory 11 (step 9). It is determined whether or not the read data is a position signal having a level equal to 90% of the high (or low) level of the ID signal and not a dropout (step 10). The steps 9 and 10 are repeated until the above conditions are satisfied. When the data signal is determined to be a position signal having a level equal to 90% of the high (or low) level of the start ID signal and not to be a dropout, the position signal is regarded as the trailing edge of the start ID signal, the start address of the audio signal is calculated from the address of the position signal, and this calculated address is stored in an address register set in another are of memory 11 (step 11).

In FIG. 3, while the start ID signal is shown sharply rising or falling, it will slowly rise or fall in fact. Therefore, only after the start ID signal has a value indicative of 90% of its high (or low) level, and no dropout (a sharp level drop for only one to a few bits) is detected, the trailing edge of the start ID signal is detected. The start address of the location where the audio signal is stored is calculated by adding the address bits corresponding to the interval $t_3$ to the address of the trailing edge. Then the stored signals are read sequentially out of memory 11 at the start address of the audio signal calculated at step 11 (step 12). It is determined whether or not the end ID level is of high (or low) level (step 13). The steps 12 and 13 are repeated until the end ID is detected. After the end ID has been detected and in order to ascertain the end ID, the above level counter counts high (or low) levels (step 14). It is determined whether or not n successive high (or low) levels have been counted (step 15). The steps 12–16 are repeated until n successive high (or low) levels are counted. When n high (or low) levels have appeard, shipping is performed by z addresses to the address of a point immediately after the trailing edge of the end ID (step 16). After this skip, a synchronizing signal (hereinafter referred to as the "sync" contained in the data signals is detected out of the signals stored in memory 11 (step 17). It is determined whether or not the sync has been detected (step 18). The steps 17 and 18 are repeated until the sync has been detected. After the sync has been detected, the data signal is read (step 19). The contents of the data signal are decoded by MICOM 5 (step 20). The result is stored in a data signal register provided in another area of memory 11 (step 21). Then, sectors are counted by a sector counter provided in another area of memory 11 (step 22). It is determined whether or not the above flow operation has been performed on each of the four sectors by determining whether the contents of the sector counter is 4 (step 23). When the flow operation has not been completed for all the four sectors, address shipping or jumping is performed by y addresses to the address of a point immediately before the leading edge of the start ID of the next sector (step 24). The steps 3–23 are repeated for all the four sectors. Correct data information is determined by the information in all the four sectors and stored in a register provided in another area of memory 11.

In the above manner, the audio start address of each sector and correct information are obtained. However, if the data signal follows the end ID, as mentioned above, the detection of the data signal must be performed after detection of the start and end IDs. That is, detection of the end ID is indispensable. In addition, since the length of the audio signal between the start ID and the end ID is variable, a jump in address from the start ID to the end ID is impossible, the signals stored in memory 11 must be retrieved through the length of the audio signal until the end ID is detected. According to the foregoing, the steps 12–16 correspond to the processing from the detection of the start ID to the detection of the end ID. If the audio signal has been recorded at its maximum length in a sector, it will take a few seconds for MICOM 5 to detect the end ID, which is a large time loss compared to the case where the steps 12 to 16 are omitted. On the other hand, when the video and audio signals are reproduced concurrently, the information obtained by the foregoing is used for control of the reproduction. Therefore, the audio reproduction starts after a time loss of a few minutes and hence great non-coincidence in time between the reproduced video and audio signals results. In video-audio concurrent reproduction, when the data signal is being reproduced, no information on the data signal is available until after the end ID and hence the information on the compression ratio of the audio signal as mentioned above is not available. This renders concurrent reproduction of video and audio signals substantially impossible.

As described above, since the data signal is after the end ID, the access to data is slow, which, as a result, will be an obstacle to the reproduction processing.

In addition, if, for example, two memories, each memory having a memory capacity for one sector, should each be provided for a respective one of an even and an odd sectors and the stored signals should be read out of the corresponding memory while being recorded in the corresponding sectors, the tail end portion of each sector, i.e. the data signal portion, may be damagingly superimposed on the signal in the next sector. In this case, the reproduction processing of these data signals would be substantially impossible.

SUMMARY OF THE INVENTION

An object of the present invention is to provide an information recording system which records an information signal together with the start and end signals indicative of the start and end of the information signal and the related data signal so that in reproduction, the system has a very short access time for the data signals.

Another object of the present invention is to provide an information recording system which records an information signal together with the start and end signals indicative of the start and end of the information signal and the related data signal so that data signals are hardly damaged.

According to a preferred embodiment of the present invention for attaining the above objects, there is disclosed an information recording apparatus which records a start signal indicative of the information signal, a data signal on the information, the information signal, and an end signal indicative of the end of the information signal in this order.

Still another object of the present invention is to provide an information recording system which records an information signal together with the start and end signals indicative of the start and end of the information signal and the related data signal so that the respective signals except the information signal are combined at correct timings.

Other objects of the present invention will be apparent from the following detailed description of embodiments thereof.

Which the present invention is applied to the audio recording described in FIGS. 1-5 will be described.

Figure 6:
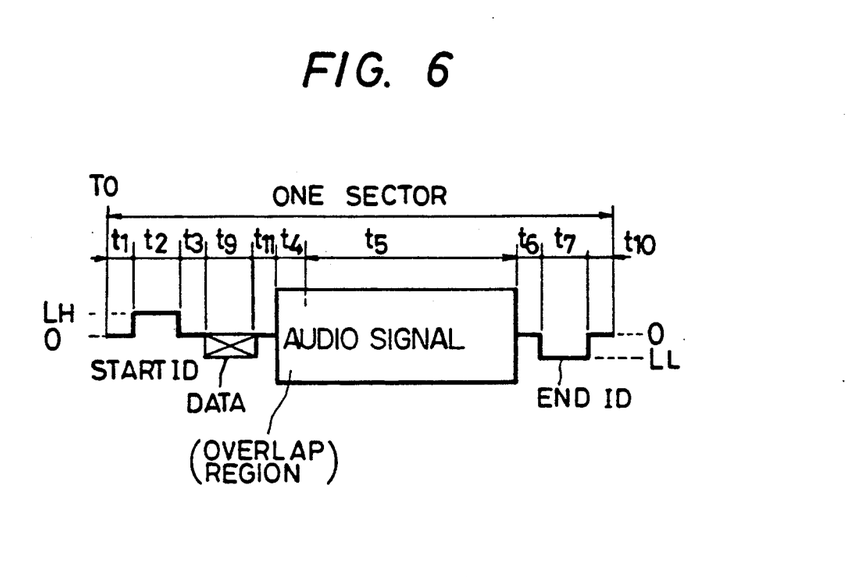
FIG. 6 shows one example of signal arrangement of the present invention applied to the audio recording described in FIGS. 1-3.

FIG. 6 shows the form of the audio and additional signals according to the present invention recorded in one of the sectors mentioned above. After an elapse of $t_1$ from $T_0$, a start ID signal to obtain the timing of reading the audio signal continues for $t_2$. After a blank of $t_3$, the data signal continues for $t_9$. Then after a blank time $t_{11}$, the audio signal begins. For the preceding time $t_4$, the signal on this sector overlaps that on the preceding sector. However, there is no overlapping portion either in the first sector of a single track within which the whole audio signal is completed or in the first sector of the starting one of the tracks through which the audio signal are continuously recorded. The remaining sector portion for $t_5$ is for a new audio signal and the length of this sector portion is variable. Subsequently, after a blank of $t_6$, the end ID signal to detect the end of the audio signal continues for $t_7$. Then, after a blank $t_{10}$, the next sector appears.

Figure 7A:
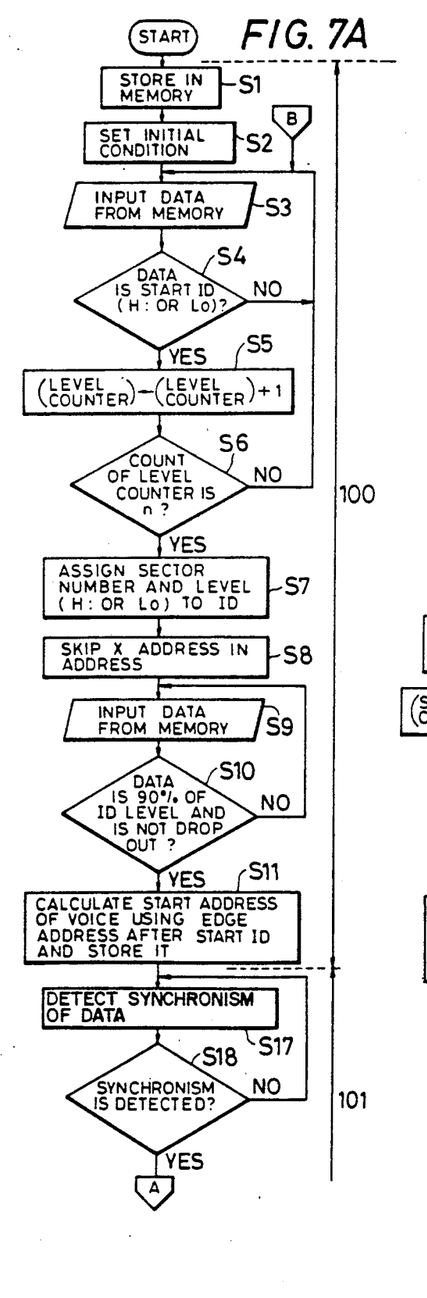
FIGS. 7A and 7B and 8A and 8B are flowcharts showing a portion of the operation flow for MICOM of FIG. 4 for reproducing the signals arranged in accordance with the arrangement of FIG. 6.
Figure 7B:
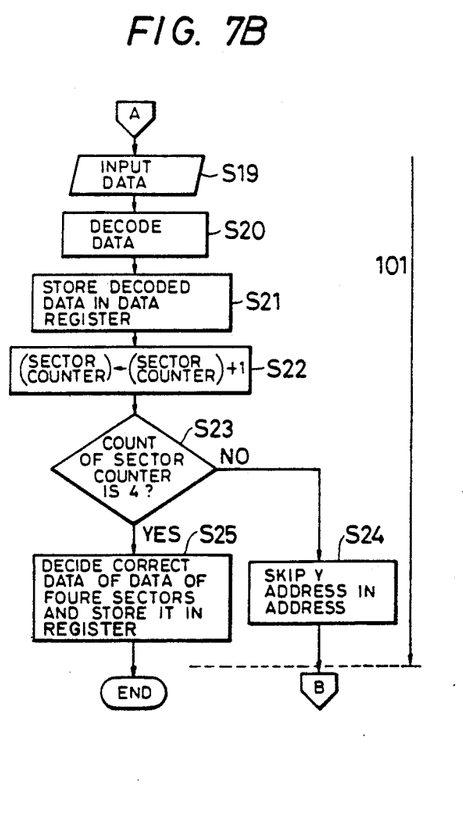

FIG. 7 is the preferable operation sequence of MICOM 5 for reproduction of the signals, recorded in the arrangement of FIG. 6, using the apparatus of FIG. 4.

In FIG. 7, a block 100 corresponds to steps 1 to 11 of FIG. 5; a block 101 corresponds to the steps 17 to 25 of FIG. 5. In block 100, in the same way as in the steps 1 to 11 of FIG. 5, the start ID signal is detected out of the signals stored in memory 11. After ascertainment of the ID signal, the sector number and level are assigned to the start ID signal and the start address of the audio signal is calculated and stored. Immediately thereafter, in block 101, in the same way as in steps 17 to 25 of FIG. 5, the data signal is detected and decoded, and the contents of a correct data signal are stored by the data signals for the four sectors.

Figure 8A:
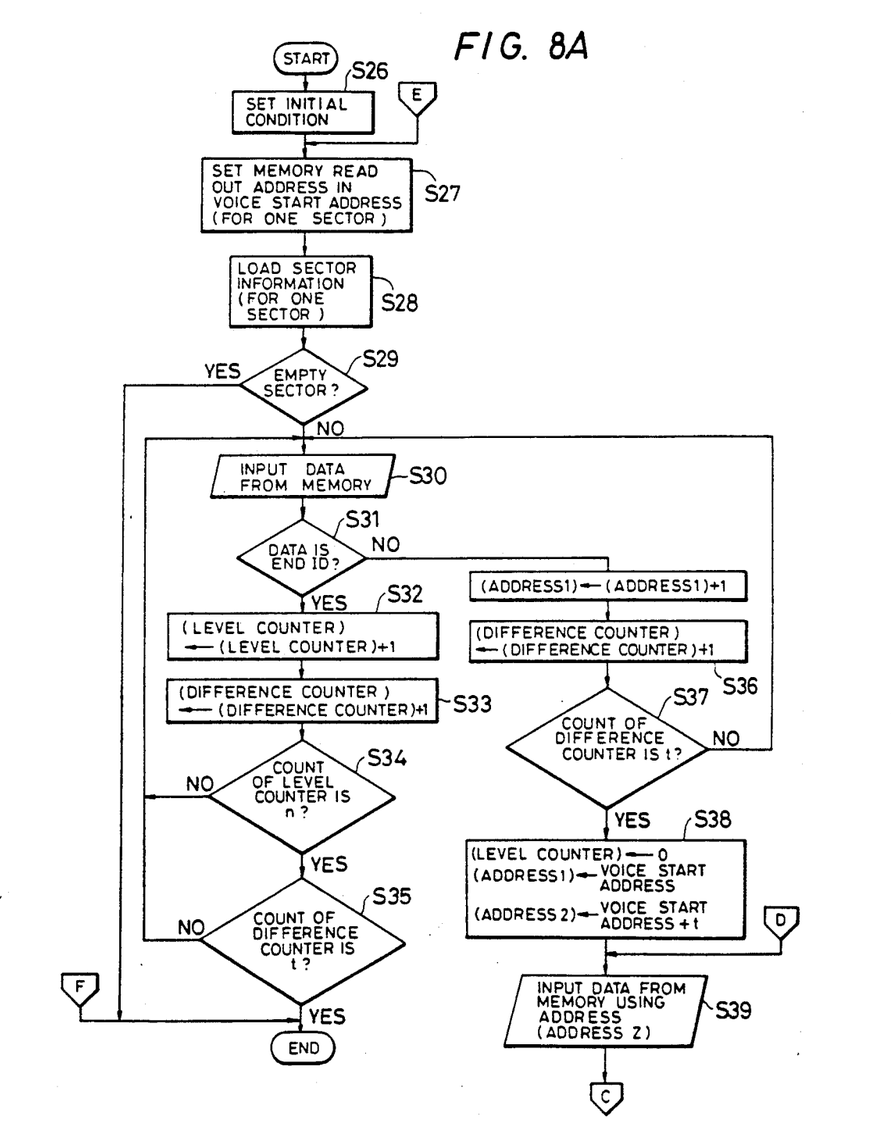
Figure 8B:
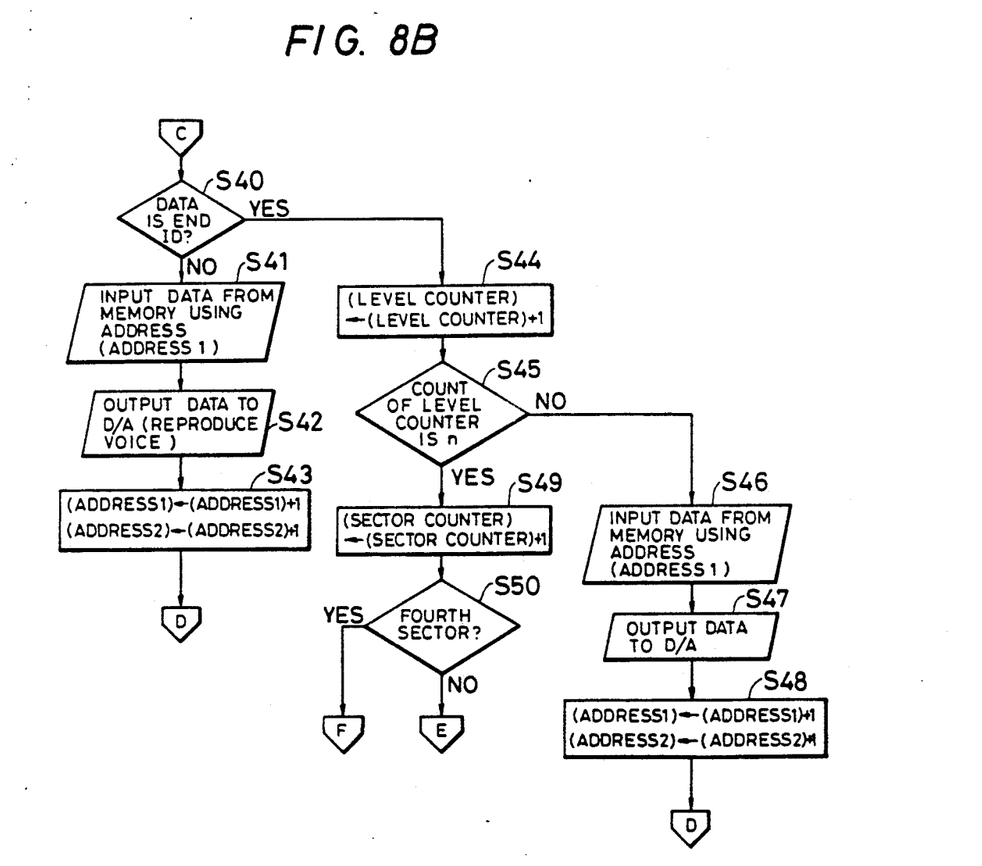

FIG. 8 shows a flow for audio reproduction on the basis of the information obtained in accordance with the flow of FIG. 7. First, initial conditions such as the expansion ratio, i.e., the frequency for reading data out of memory 11, etc., are set using the information derived in accordance with the information of FIG. 7 (step 26). The address read out of memory 11 is set in the audio start address derived in accordance with the flow of FIG. 7 (step 27). On the other hand, the level of the start ID signal assigned previously in the flow step 7 of FIG. 7 is loaded (step 28). It is then determined whether or not there is an empty sector (step 29). In this case, when the start ID signal is of low level, it is predetermined that the sector to which the start ID signal has been annexed is an empty sector in which no audio signals are recorded. Thus, the level assignment of start ID signal is loaded at step 23, i.e. the level of the start ID signal is detected for being high or low. If this level is high, control passes to step 30. If this level is low, control branches to END.

When it is detected that the level of the start ID signal assigned in step 29 is high and the sector is not empty, signals are read out of memory 11 at the audio signal start address (step 30) and the end ID signal is detected (step 31). When the end ID signal is not detected, the sequence goes to step 36. When the end ID signal is detected the sequence branches to step 32.

Now, the process performed when the end ID signal has not been detected will be described.

At step 31, when it is not determined that the data is not the end ID signal, the difference counter is incremented (step 36) and it is determined whether or not the count of the difference counter represents a delay corresponding to t counts (step 37). The steps 1 to 37 are repeated to retrieve memory 11 until the count of the difference counter reaches t counts. When the count has reached t, the level counter is cleared, and the address consisting of the audio start address plus t address is stored in a register at an address 2 provided in another area of memory 11. On the other hand, delayed t addresses relative to the address stored in the register at an address 2, i.e. the start address of the audio signal, is stored in the register at an address 1 (step 38). The signal is read out of memory 11 using the address in address of 2 (step 39). It is determined whether or not the read data is the end ID signal (step 40). If it is not the end ID signal, the signal is read out of memory 11 using the address in address 1 (step 41). The read signal is output as an audio signal to D/A converter 12 (step 42). The addresses in addresses 1 and 2 are then incremented (step 43). Control then returns to step 39. Then the detection of the end ID signal continues while audio signal is being reproduced. When the end ID has been detected and in order to ascertain that the data is the end ID signal, the level counter is incremented (step 44). It is determined whether or not the level counter has counted up to n (step 45). If the count has not reached n, the data cannot be regarded as the end ID and the data is read out of memory 11 using the address in address 1 (step 46). The read data is output to D/A converter 12 (step 47). The addresses in addresses 1 and 2 are incremented (step 48). Then, control returns to step 39 and audio signals continue to be output until the end ID is ascertained. When the read data is ascertained as the end ID, the sector counter is incremented (step 49). Then it is determined whether or not the processing has reached sector 4 (step 50). When the processing has not reached, it passes to the next sector and repeats the above sequence. On the other hand, when the processing has reached sector 4, the processing ends.

As described above, in the particular embodiment, arrangement is such that the end ID may be read in advance in accordance with the address in address 2 which has been incremented by t addresses over the address in address 1 at which the audio signal is read.

When the end ID signal has been detected in accordance with the address in address 2 while the audio signal in a sector is being read in accordance with the address in address 1, the sequence passes from step 40 to steps 44, 45. Then it is determined whether or not the count of the sector counter is 4, i.e. whether or not all the audio signals in the four sectors provided on a single track have been read. If all the audio signals have not been read, the sequence branches from step 50 to step 27 to set the address in address 1 used for reading the audio signal at the audio start address in the next sector. The steps 30 and subsequent steps mentioned above are then executed to reproduce the audio signal in the next sector.

When, at step 31, the end ID has been detected and the sequence has branched to step 31, the level counter is incremented for ascertaining the end ID counts (step 32). The difference counter is incremented to reproduce the audio signal with a delay of addresses corresponding to a time duration of t from the address at which the level counter is detecting the end ID (step 33). It is determined whether or not the level counter has counted n times (step 34). If the answer is no, the step 30 and the subsequent steps will be repeated. If the level counter has counted n times, it is determined whether the difference counter has counted up to t (step 35). If the answer is not the step 30 and the subsequent steps will be repeated. If the answer is yes, the audio signal is regarded as being absent at that time and the operation ends.

As described above, according to the signal arrangement of FIG. 6, the reproduction access time for the data signal stored in memory 11 is extremely shortened. Thus, the audio signal can be very well reproduced on the basis of the data signal.

If two memories each having a capacity for one sector are assigned, one for each of an add and an even sectors and the signals stored in the memories are read alternately in sector units and recorded on sheet 1, the data signal is recorded before the end ID which is hardly prone to be superimposed although there may be a slight change in the timing of switching the memory. Thus, the data is recorded successfully without being damaged by superimposition.

The above embodiment first derives information from the start ID and the data signal of the recorded signal including the start ID, data signal, audio signal and end ID signal and reproduces the audio signal. If the steps of detecting the start ID and decording the data signal are provided in the setting of initial conditions such as the expansion ratio of the audio data in step 26 of the flowchart of FIG. 8, audio reproduction can be performed on a real time basis without performing the sequence operation of FIG. 7.

Namely, in the flowchart of FIG. 7, all the data signals in the four sectors are detected and a correct data signal is determined from these four data signals, as mentioned above. Therefore, when the expansion ratio of the audio data, etc., are initially set, a time lag for the time required for such determination will occur; i.e. the time lag will occur when control passes from step 26 to step 27. However, if, after the start ID of a sector has been detected, the expansion ratio of the audio data, etc., are initially set on the basis of the data signal of that sector, the time lag can be shortened and audio reproduction can be performed on an improved real time basis.

A recording apparatus suitable for forming and recording the signal-having the arrangement shown in FIG. 3 or FIG. 6 will now be described with respect to FIG. 9.

Figure 9:
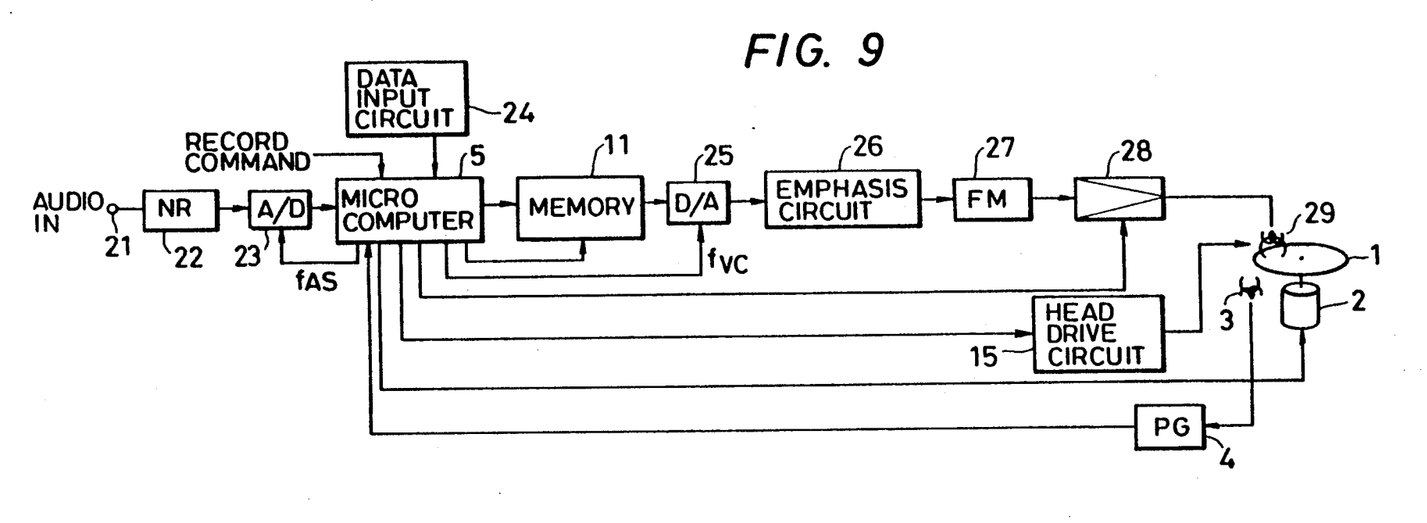
FIG. 9 is a block diagram of a recording apparatus as one embodiment of the present invention for recording the signals following the arrangement of FIG. 6.

FIG. 9 is a block diagram of such recording apparatus. In FIG.9, the same reference numeral as in FIG. 4 denotes the same element as that described above.

In FIG. 9, the audio signal is input to a terminal 21, passes through a noise reduction circuit 22 to an A/D converter 23 where the audio signal is sampled at a sample frequency $f_{AS}$ from a controller including a microcomputer (hereinafter referred to as the "MICOM") 5, etc., and converted into a digital signal. The digital audio signal for one sample is sent to MICOM 5. MICOM 5 stores this signal is internal memory and then transfers this signal to memory 11 for writing.

Figure 10:
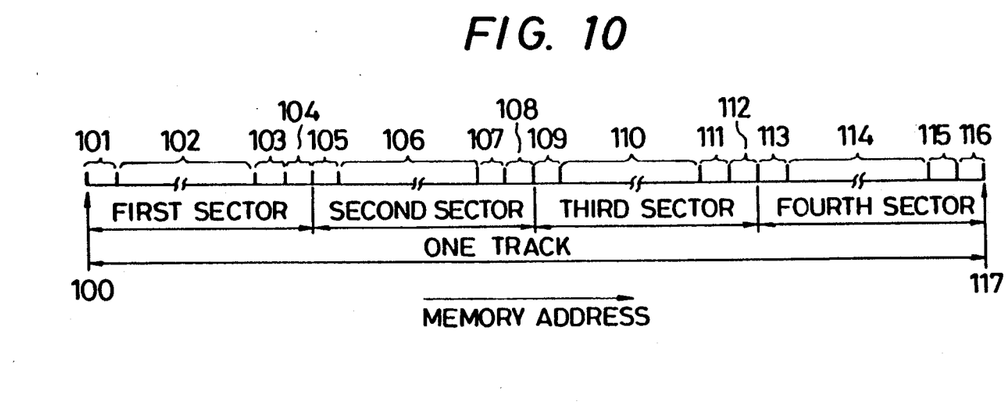
FIG. 10 illustrates allocation of the areas of the memory 11 in which the signals are stored.

Assume that memory 11 has a capacity for one track, for simplification of description. The digital audio signal is stored in memory 11, as shown in FIG. 10. In FIG. 10, the start address 100 of memory 11 has a given phase relationship to the PG mark (not shown) on magnetic sheet 1 when the timing generator (not shown) within MICOM 5 is reset by the output signal from PG detection circuit 4. The end address 117 of memory 11 represents the memory address immediately before resetting is performed. Areas 101–116 provide a memory area corresponding to one track. In FIG. 10, the ditized audio signal is written by MICOM 5 into memory areas 102, 106, 110 and 114 excluding predetermined memory areas, i.e. shown by reference numerals 101, 103–105, 107–109, 111–113, 115 and 116 of FIG. 10.

When the writing of the audio signal has been completed, MICOM 5 writes the start ID signal, end ID signal, and data signal in accordance with the predetermined signal format mentioned above into the predetermined areas of memory 11, i.e. shown by reference numerals 101, 103, 105, 107–109, 111–113, 115 and 116. That is, if the format of FIG. 3 is obeyed, the start ID signals are written into the areas 101, 105, 109, 113; the end ID signals written into the areas 103, 107, 111, 115; and the data signals written into areas 104, 108, 112, 116. Note that if the format shown in FIG. 6 is obeyed, the above areas will be slightly modified.

When the respective signals are written by MICOM 5 in the arrangement obeying the predetermined format into memory 11 in order of address in the memory. MICOM 5 produces a recording gate signal corresponding to one round of sheet 1 on the basis of the PG signal from PG detector 4. The gate signal opens the gate for recording amplifier 28. This causes a recording current for one round to flow through head 29 and recording to be performed on one track. In this case, the contents of memory 11 are continuously read at a read rate $f_{VC}$ in synchronism with PG signal. Thus, D/A converter 25 is supplied continuously with signals for four sectors, one for each such format and produces an output containing an analog signal waveform corresponding to its digital input signal. The output of D/A converter 25 is delivered through preemphasis circuit 26 to FM modulator 27 where, after FM modulation, the signal is delivered to recording amplifier 28. The FM signal is present at all times in synchronism with the PG signal. The gate of recording amplifier 28 is opened for an interval of one round in synchronism with the PG signal for recording of the one-track signal.

The sheet rotating motor 2 rotates sheet 1 under control of MICOM 5, for example, at 3,600 rpm in the case of NTSC system. The positional control of head 29 on magnetic sheet 1 is performed by head driver circuit 15 under control of MICOM 5.

As described above, in the particular embodiment, when the audio signal is compressed, and recorded together with the ID signals and the data signal, the audio signal is first sampled and A/D converted, and the resulting signal data are stored in sequence in memory 11 at addresses excluding the addresses corresponding to the positions where the ID signal and the data signal are to be inserted in accordance with a predetermined format. After the storage of the audio signal has been completed, the ID signals and the data signals are now stored in the addresses, which remained empty during storage of the audio signal, such that the resulting signal arrangement in memory 11 obeys the predetermined format. Thus, if the information stored in memory 11 is then read in sequence in order of address, the signals arranged in accordance with the predetermined format will be obtained. This method is very useful when it is necessary to read the contents of memory 11 at very high speed, as when it is required to compress and record information at very high speed. That is, since it is only required to read the contents of the memory simply in order of address, no complex hardware is needed, very high speed reading of the signals is possible and the compression ratio can be increased greatly. On the other hand, when the memory is written, there is a relatively much greater time margin. Therefore, it is very rational to perform an operation such as that mentioned above during writing, and hardware load is reduced.

In a modification, the writing of signals into memory 11 may be performed in the order of signals arranged in accordance with a predetermined format because there is a relatively much greater time margin during writing. On the contrary, first, the ID signals and the data signal may be stored in their respective addresses and the audio signal may then be stored in the remaining address.

In the particular embodiment, the memory 11 has been described as having a capacity for a track, i.e. four sectors. However, the frequency $f_{VC}$ may be set such that if the memory has a capacity for one sector, it will take 1/240 seconds for all the information in the memory to be read, and that if the memory has a capacity for one track, it will take 1/60 seconds for all the information to be read (this implies that sheet 1 is rotated at 3,600 rpm).

According to the present embodiments, the start ID signal, data signal and end ID signal are stored in memory areas excluding the area where the audio signal is stored. Thus, advantageously, complex timing control can be avoided, both the signals can be easily and well adjusted in timing, and hardware load and hence cost can be reduced compared with the method including the steps of storing only an audio signal in a memory, and reading the audio signal out of the memory while causing a microcomputer to produce the start ID signal, data ID signal, and end ID signal at appropriate timing.

While the above embodiment exemplifies audio recording to which the present invention is applied, of course, the invention disclosed in the particular embodiment is not limited to this.

As described above, according to the particular embodiment, an information signal is recorded together with the start signal, end signal, and the related data signal such that the access time for the data signal during reproduction is extremely shortened and that the data signal is well recorded without being damaged by other signals. This is very advantageous for information recording and reproducing apparatus of this type.

What we claim is:

1. An apparatus for recording a time base compressed information signal on a recording medium, comprising:
   (a) means for producing a pair of signals including a start signal indicative of the beginning of the time base compressed information signal and an end signal indicative of the end of the time base compressed information signal to sandwich the time base compressed information signal therebetween;
   (b) means for providing a control data signal which is used to control an expanding process of the time base compressed information signal according to the time base compressed information signal;
   (c) memory means for receiving, in the following order, the start signal, the control data signal, the time base compressed information signal, and the end signal; and
   (d) recording means for sequentially reading out the signals stored in said memory means in said order and for according said signals read out from said memory means on said recording medium.

2. An apparatus according to claim 1, wherein said recording medium comprises a disk-like medium.

3. An apparatus according to claim 2, wherein said disk-like recording medium includes a plurality of concentric tracks formed thereon, each track including four sectors, and said recording means records the combined signal on each of said sectors.

4. An apparatus according to claim 1, wherein said recording medium includes a magnetic recording medium.

5. An apparatus according to claim 1, wherein the time base compressed information signal is an audio signal compressed in time base.

6. An apparatus according to claim 5, wherein the control data signal is a signal indicative of the time-base compression ratio for said time base compressed audio signal.

7. An apparatus for recording a time base compressed information signal on a recording medium, comprising:
   (a) means for producing a pair of signals including a start signal indicative of the beginning of the time based compressed information signal and an end signal indicative of the end of the time base compressed information signal to sandwich the time base compressed information signal therebetween;

(b) means for providing a control data signal which is used to control an expanding process of the time base compressed information signal according to the time base compressed information signal;

(c) memory means for storing the start signal, the control data signal, the time base compressed information signal and the end signal; and (d) recording means for reading out the signals stored in said memory means in order of the start signal, the control data signal, the time base compressed information signal, and the end signal and for recording the read out signals on the recording medium.

8. An apparatus according to claim 7, wherein said recording medium comprises a disk-like medium.

9. An apparatus according to claim 8, wherein said disk-like recording medium includes a plurality of concentric tracks formed thereon, each track including four sectors, and said recording means records the combined signal on each of said sectors.

10. An apparatus according to claim 7, wherein said recording medium includes a magnetic recording medium.

11. An apparatus according to claim 7, wherein the time base compressed information signal is an audio signal compressed in time base.

12. An apparatus according to claim 11, wherein the control data signal is a signal indicative of the time base compression ratio for said time base compressed audio signal.

* * * * *

UNITED STATES PATENT AND TRADEMARK OFFICE
CERTIFICATE OF CORRECTION

PATENT NO. : 5,023,730

DATED : June 11, 1991

INVENTOR(S) : TSUGUHIDE SAKATA ET AL.

It is certified that error appears in the above-identified patent and that said Letters Patent is hereby corrected as shown below:

ON THE TITLE PAGE,

AT 75 INVENTORS

"Machida;" should read --Tokyo;--.

SHEET 4 OF 8

FIG. 5C, "FOURE SECTORS" should read --FOUR SECTORS--.

SHEET 5 OF 8

FIG. 7B, "FOURE SECTORS" should read --FOUR SECTORS--.

COLUMN 2

Line 19, "a" should be deleted.

COLUMN 3

Line 56, "shipping" should read --address skipping--.

COLUMN 5

Line 46, "stored." should read --stored.--.
DETAILED DESCRIPTION OF THE PREFERRED EMBODIMENT
¶ Now one embodiment of the present invention in--.

Line 47, "Which" should read --which--.

COLUMN 6

Line 48, "steps 1" should read --steps 31--.

UNITED STATES PATENT AND TRADEMARK OFFICE
CERTIFICATE OF CORRECTION

PATENT NO. : 5,023,730

DATED : June 11, 1991

INVENTOR(S) : TSUGUHIDE SAKATA ET AL.

It is certified that error appears in the above-identified patent and that said Letters Patent is hereby corrected as shown below:

COLUMN 7

Line 48, "not" should read --no,--.

COLUMN 8

Line 2, "decording" should read --decoding--.
Line 35, "is" should read --in--.
Line 47, "ditized" should read --digitized--.
Line 66, "memory." should read --memory,--.

Signed and Sealed this

Twenty-first Day of April, 1992

Attest:

HARRY F. MANBECK, JR.

*Attesting Officer*  *Commissioner of Patents and Trademarks*